(12) United States Patent
Frenkel et al.

(10) Patent No.: US 9,369,446 B2
(45) Date of Patent: Jun. 14, 2016

(54) SECURE REMOTE DESKTOP

(71) Applicant: Waterfall Security Solutions Ltd., Rosh Ha'ayin (IL)

(72) Inventors: Lior Frenkel, Misgav Dov (IL); Andrew Ginter, Calgary (CA)

(73) Assignee: WATERFALL SECURITY SOLUTIONS LTD., Rosh Ha'Ayin (IL)

( * ) Notice: Subject to any disclaimer, the term of this patent is extended or adjusted under 35 U.S.C. 154(b) by 0 days.

(21) Appl. No.: 14/813,144

(22) Filed: Jul. 30, 2015

(65) Prior Publication Data

US 2016/0112384 A1    Apr. 21, 2016

(30) Foreign Application Priority Data

Oct. 19, 2014 (IL) .......................................... 235175

(51) Int. Cl.
*H04L 29/06* (2006.01)
(52) U.S. Cl.
CPC .......... *H04L 63/0457* (2013.01); *H04L 63/061* (2013.01); *H04L 63/0876* (2013.01)
(58) Field of Classification Search
CPC .................................................. H04L 63/0457
USPC ............................................................ 726/26
See application file for complete search history.

(56) References Cited

U.S. PATENT DOCUMENTS

| | | |
|---|---|---|
| 4,163,289 A | 7/1979 | Schmidt |
| 4,213,177 A | 7/1980 | Schmidt |
| 4,214,302 A | 7/1980 | Schmidt |
| 4,375,665 A | 3/1983 | Schmidt |
| 4,964,046 A | 10/1990 | Mehrgardt et al. |
| 4,985,919 A | 1/1991 | Naruse et al. |
| 4,987,595 A | 1/1991 | Marino, Jr. et al. |
| 5,140,681 A | 8/1992 | Uchiyama et al. |
| 5,163,138 A | 11/1992 | Thirumalai |
| 5,185,877 A | 2/1993 | Bissett et al. |
| 5,289,478 A | 2/1994 | Barlow et al. |

(Continued)

FOREIGN PATENT DOCUMENTS

| | | |
|---|---|---|
| EP | 1632833 A2 | 3/2006 |
| GB | 2267986 A | 12/1993 |

(Continued)

OTHER PUBLICATIONS

U.S. Appl. No. 14/512,496 Office Action dated Nov. 5, 2015.

(Continued)

*Primary Examiner* — Andrew Nalven
*Assistant Examiner* — Khang Do
(74) *Attorney, Agent, or Firm* — D. Kligler IP Services Ltd.

(57) ABSTRACT

A method for communication includes receiving in a secure installation via a network from a remote user terminal an input comprising a stream of symbols that has been encrypted using a preselected encryption key. The encrypted stream of symbols is decoded in the secure installation using a decryption key corresponding to the preselected encryption key, to produce a clear stream of symbols. A computer program running on a processor in the secure installation is used in processing the symbols in the clear stream and generating a graphical output in a predefined display format in response to processing the symbols. The graphical output is outputted from the secure installation to the network in an unencrypted format for display on the remote user terminal.

20 Claims, 3 Drawing Sheets

(56) References Cited

U.S. PATENT DOCUMENTS

| | | |
|---|---|---|
| 5,388,212 A | 2/1995 | Grube et al. |
| 5,530,758 A | 6/1996 | Marino, Jr. et al. |
| 5,548,646 A | 8/1996 | Aziz et al. |
| 5,677,952 A | 10/1997 | Blakley et al. |
| 5,732,278 A | 3/1998 | Furber et al. |
| 5,748,871 A | 5/1998 | DuLac et al. |
| 5,815,577 A | 9/1998 | Clark |
| 5,822,435 A | 10/1998 | Boebert et al. |
| 5,825,879 A | 10/1998 | Davis |
| 5,829,046 A | 10/1998 | Tzelnic et al. |
| 5,835,726 A | 11/1998 | Shwed et al. |
| 5,940,507 A | 8/1999 | Cane et al. |
| 5,946,399 A | 8/1999 | Kitaj et al. |
| 5,995,628 A | 11/1999 | Kitaj et al. |
| 6,023,570 A | 2/2000 | Tang et al. |
| 6,049,611 A | 4/2000 | Tatebayashi et al. |
| 6,134,661 A | 10/2000 | Topp |
| 6,167,459 A | 12/2000 | Beardsley et al. |
| 6,170,023 B1 | 1/2001 | Beardsley et al. |
| 6,185,638 B1 | 2/2001 | Beardsley et al. |
| 6,202,095 B1 | 3/2001 | Beardsley et al. |
| 6,239,810 B1 | 5/2001 | Van Hook et al. |
| 6,240,514 B1 | 5/2001 | Inoue et al. |
| 6,289,377 B1 | 9/2001 | Lalwaney et al. |
| 6,311,272 B1 | 10/2001 | Gressel |
| 6,317,831 B1 | 11/2001 | King |
| 6,442,607 B1 | 8/2002 | Korn et al. |
| 6,467,009 B1 | 10/2002 | Winegarden et al. |
| 6,470,449 B1 | 10/2002 | Blandford |
| 6,574,640 B1 | 6/2003 | Stahl |
| 6,601,126 B1 | 7/2003 | Zaidi et al. |
| 6,601,170 B1 | 7/2003 | Wallace, Jr. |
| 6,615,244 B1 | 9/2003 | Singhal |
| 6,643,701 B1 | 11/2003 | Aziz et al. |
| 6,738,388 B1 | 5/2004 | Stevenson et al. |
| 6,738,742 B2 | 5/2004 | Badt et al. |
| 6,758,404 B2 | 7/2004 | Ladyansky |
| 6,862,663 B1 | 3/2005 | Bateman |
| 6,915,369 B1 | 7/2005 | Dao et al. |
| 6,915,435 B1 | 7/2005 | Merriam |
| 6,931,549 B1 | 8/2005 | Ananda |
| 6,957,330 B1 | 10/2005 | Hughes |
| 6,963,817 B2 | 11/2005 | Ito et al. |
| 6,966,001 B2 | 11/2005 | Obara et al. |
| 6,970,183 B1 | 11/2005 | Monroe |
| 6,986,061 B1 | 1/2006 | Kunzinger |
| 7,031,322 B1 | 4/2006 | Matsuo |
| 7,062,587 B2 | 6/2006 | Zaidi et al. |
| 7,069,437 B2 | 6/2006 | Williams |
| 7,100,048 B1 | 8/2006 | Czajkowski et al. |
| 7,171,566 B2 | 1/2007 | Durrant |
| 7,200,693 B2 | 4/2007 | Jeddeloh |
| 7,234,158 B1 | 6/2007 | Guo et al. |
| 7,254,663 B2 | 8/2007 | Bartley et al. |
| 7,260,833 B2 | 8/2007 | Schaeffer |
| 7,324,515 B1 | 1/2008 | Chapman |
| 7,366,894 B1 | 4/2008 | Kalimuthu et al. |
| 7,509,141 B1 | 3/2009 | Koenck et al. |
| 7,523,856 B2 | 4/2009 | Block et al. |
| 7,581,097 B2 | 8/2009 | Catherman et al. |
| 7,649,452 B2 | 1/2010 | Zilberstein et al. |
| 7,660,959 B2 | 2/2010 | Asher et al. |
| 7,675,867 B1 | 3/2010 | Mraz et al. |
| 7,685,436 B2 | 3/2010 | Davis et al. |
| 7,698,470 B2 | 4/2010 | Ruckerbauer et al. |
| 7,716,467 B1 | 5/2010 | Deffet et al. |
| 7,761,529 B2 | 7/2010 | Choubal et al. |
| 7,761,704 B2 | 7/2010 | Ho et al. |
| 7,792,300 B1 | 9/2010 | Caronni |
| 7,814,316 B1 | 10/2010 | Hughes et al. |
| 7,815,548 B2 | 10/2010 | Barre et al. |
| 7,845,011 B2 | 11/2010 | Hirai |
| 7,849,330 B2 | 12/2010 | Osaki |
| 7,941,828 B2 | 5/2011 | Jauer |
| 7,992,209 B1 | 8/2011 | Menoher et al. |
| 8,041,832 B2 | 10/2011 | Hughes et al. |
| 8,046,443 B2 | 10/2011 | Parker et al. |
| 8,223,205 B2 | 7/2012 | Frenkel et al. |
| 8,756,436 B2 | 6/2014 | Frenkel et al. |
| 9,116,857 B2 | 8/2015 | Frenkel et al. |
| 2001/0033332 A1 | 10/2001 | Kato et al. |
| 2002/0064282 A1 | 5/2002 | Loukianov et al. |
| 2002/0065775 A1 | 5/2002 | Monaghan |
| 2002/0077990 A1 | 6/2002 | Ryan, Jr. |
| 2002/0083120 A1 | 6/2002 | Soltis |
| 2002/0112181 A1 | 8/2002 | Smith |
| 2002/0174010 A1 | 11/2002 | Rice |
| 2002/0186839 A1 | 12/2002 | Parker |
| 2002/0188862 A1 | 12/2002 | Trethewey et al. |
| 2002/0191866 A1 | 12/2002 | Tanabe |
| 2002/0199181 A1 | 12/2002 | Allen |
| 2003/0005295 A1 | 1/2003 | Girard |
| 2003/0037247 A1 | 2/2003 | Obara et al. |
| 2003/0039354 A1 | 2/2003 | Kimble et al. |
| 2003/0061505 A1 | 3/2003 | Sperry et al. |
| 2003/0114204 A1 | 6/2003 | Allen et al. |
| 2003/0140090 A1 | 7/2003 | Rezvani et al. |
| 2003/0140239 A1 | 7/2003 | Kuroiwa et al. |
| 2003/0159029 A1 | 8/2003 | Brown et al. |
| 2003/0188102 A1 | 10/2003 | Nagasoe et al. |
| 2003/0212845 A1 | 11/2003 | Court et al. |
| 2003/0217262 A1 | 11/2003 | Kawai et al. |
| 2004/0022107 A1 | 2/2004 | Zaidi et al. |
| 2004/0024710 A1 | 2/2004 | Fernando et al. |
| 2004/0070620 A1 | 4/2004 | Fujisawa |
| 2004/0071311 A1 | 4/2004 | Choi et al. |
| 2004/0080615 A1 | 4/2004 | Klein et al. |
| 2004/0125077 A1 | 7/2004 | Ashton |
| 2004/0175123 A1 | 9/2004 | Lim et al. |
| 2004/0181679 A1 | 9/2004 | Dettinger et al. |
| 2004/0198494 A1 | 10/2004 | Nguyen et al. |
| 2004/0217890 A1 | 11/2004 | Woodward et al. |
| 2004/0247308 A1 | 12/2004 | Kawade |
| 2004/0250096 A1 | 12/2004 | Cheung et al. |
| 2005/0015624 A1 | 1/2005 | Ginter et al. |
| 2005/0033990 A1 | 2/2005 | Harvey et al. |
| 2005/0057774 A1 | 3/2005 | Maruyama |
| 2005/0066186 A1 | 3/2005 | Gentle et al. |
| 2005/0071632 A1 | 3/2005 | Pauker et al. |
| 2005/0085964 A1 | 4/2005 | Knapp et al. |
| 2005/0091487 A1 | 4/2005 | Cross et al. |
| 2005/0108524 A1 | 5/2005 | Witchey |
| 2005/0119967 A1 | 6/2005 | Ishiguro et al. |
| 2005/0120214 A1 | 6/2005 | Yeates et al. |
| 2005/0120251 A1 | 6/2005 | Fukumori et al. |
| 2005/0138369 A1 | 6/2005 | Lebovitz et al. |
| 2005/0165939 A1 | 7/2005 | Nikunen et al. |
| 2005/0216648 A1 | 9/2005 | Jeddeloh |
| 2005/0264415 A1 | 12/2005 | Katz |
| 2005/0270840 A1 | 12/2005 | Kudelski |
| 2006/0047887 A1 | 3/2006 | Jeddeloh |
| 2006/0064550 A1 | 3/2006 | Katsuragi et al. |
| 2006/0085354 A1 | 4/2006 | Hirai |
| 2006/0085534 A1 | 4/2006 | Ralston et al. |
| 2006/0095629 A1 | 5/2006 | Gower et al. |
| 2006/0136724 A1 | 6/2006 | Takeshima et al. |
| 2006/0155939 A1 | 7/2006 | Nagasoe et al. |
| 2006/0161791 A1 | 7/2006 | Bennett |
| 2006/0165347 A1 | 7/2006 | Mita |
| 2006/0173787 A1 | 8/2006 | Weber et al. |
| 2006/0179208 A1 | 8/2006 | Jeddeloh |
| 2006/0195704 A1 | 8/2006 | Cochran et al. |
| 2006/0220903 A1 | 10/2006 | Zigdon et al. |
| 2006/0224848 A1 | 10/2006 | Matulik et al. |
| 2006/0242423 A1 | 10/2006 | Kussmaul |
| 2006/0248582 A1 | 11/2006 | Panjwani et al. |
| 2006/0259431 A1 | 11/2006 | Poisner |
| 2006/0271617 A1 | 11/2006 | Hughes et al. |
| 2006/0288010 A1 | 12/2006 | Chen et al. |
| 2006/0294295 A1 | 12/2006 | Fukuzo |
| 2007/0028027 A1 | 2/2007 | Janzen et al. |
| 2007/0028134 A1 | 2/2007 | Gammel et al. |
| 2007/0043769 A1 | 2/2007 | Kasahara et al. |
| 2007/0055814 A1 | 3/2007 | Jeddeloh |

(56) References Cited

U.S. PATENT DOCUMENTS

| | | |
|---|---|---|
| 2007/0063866 A1 | 3/2007 | Webb |
| 2007/0094430 A1 | 4/2007 | Speier et al. |
| 2007/0112863 A1 | 5/2007 | Niwata et al. |
| 2007/0150752 A1 | 6/2007 | Kudelski |
| 2007/0174362 A1 | 7/2007 | Pham et al. |
| 2007/0180263 A1 | 8/2007 | Delgrosso et al. |
| 2007/0180493 A1 | 8/2007 | Croft et al. |
| 2007/0203970 A1 | 8/2007 | Nguyen |
| 2007/0204140 A1 | 8/2007 | Shade |
| 2007/0258595 A1 | 11/2007 | Choy |
| 2007/0283297 A1 | 12/2007 | Hein et al. |
| 2008/0005325 A1 | 1/2008 | Wynn et al. |
| 2008/0059379 A1 | 3/2008 | Ramaci et al. |
| 2008/0065837 A1 | 3/2008 | Toyonaga et al. |
| 2008/0066192 A1 | 3/2008 | Greco et al. |
| 2008/0082835 A1 | 4/2008 | Asher et al. |
| 2008/0120511 A1 | 5/2008 | Naguib |
| 2008/0144821 A1 | 6/2008 | Armstrong |
| 2008/0155273 A1 | 6/2008 | Conti |
| 2008/0209216 A1 | 8/2008 | Kelly et al. |
| 2008/0244743 A1 | 10/2008 | Largman et al. |
| 2008/0263672 A1 | 10/2008 | Chen et al. |
| 2008/0288790 A1 | 11/2008 | Wilson |
| 2009/0019325 A1 | 1/2009 | Miyamoto et al. |
| 2009/0319773 A1 | 12/2009 | Frenkel et al. |
| 2009/0328183 A1 | 12/2009 | Frenkel et al. |
| 2010/0275039 A1 | 10/2010 | Frenkel et al. |
| 2010/0278339 A1 | 11/2010 | Frenkel et al. |
| 2010/0324380 A1 | 12/2010 | Perkins et al. |
| 2011/0107023 A1 | 5/2011 | McCallister et al. |
| 2011/0213990 A1 | 9/2011 | Poisner |
| 2011/0276699 A1 | 11/2011 | Pedersen |
| 2012/0198225 A1 | 8/2012 | Gadouche et al. |
| 2013/0024700 A1 | 1/2013 | Peterson et al. |
| 2013/0179685 A1* | 7/2013 | Weinstein ............... G06F 21/85 713/168 |
| 2014/0040679 A1 | 2/2014 | Shimizu et al. |
| 2014/0068712 A1* | 3/2014 | Frenkel et al. .................... 726/3 |
| 2014/0122965 A1 | 5/2014 | Zeng et al. |
| 2014/0282215 A1* | 9/2014 | Grubbs ................ G06F 3/0481 715/781 |
| 2015/0135264 A1* | 5/2015 | Amiga ................ H04L 63/0281 726/1 |

FOREIGN PATENT DOCUMENTS

| | | | |
|---|---|---|---|
| GB | 2371125 | A | 7/2002 |
| WO | 9526085 | A1 | 9/1995 |
| WO | 0110079 | A1 | 2/2001 |
| WO | 01/63879 | A1 | 8/2001 |
| WO | 2008072234 | A2 | 6/2008 |
| WO | 2010049839 | A2 | 5/2010 |

OTHER PUBLICATIONS

IBM Technical Disclosure Bulletin, Separate Write/Read Logical Paths to Optimize Library Network File System Data Rates, vol. 37, No. 9, pp. 1-3, Sep. 1994.

Innominate Security Technologies, "Press Release: Innominate joins Industrial Defender Enabled Partner Program", Germany, Apr. 14, 2008 (http://www.innominate.com/content/view/288/120/lang,en/).

Frenkel, L., "Unidirectional Information Transfer", Web issue, Jun. 2005.

Dierks, T., "The TLS Protocol", version 1.0, RFC 2246, Networking Group of IETF, Jan. 1999.

Waterfall Security Solutions Ltd., "Waterfall One Way Link Technology", 2008 (http://www.waterfall-solutions.com/home/Waterfall.sub.-Technology.a-spx).

Msisac, "Cyber Security Procurement Language for Control Systems", version 1.8, revision 3, Feb. 2008 (http://www.msisac.org/scada/documents/4march08scadaprocure.pdf).

Axis Communications, "Axis Network Cameras", 2008 (http://www.axis.com/products/video/camera/index.htm).

Check Point Software Technologies Ltd., "Extended Unified Threat Management capabilities with new multi-layer messaging security deliver best all-inclusive security solution", USA, Nov. 18, 2008 (http://www.checkpoint.com/press/2008/utm-1-edge-upgrade-111808.html).

Einey, D., "Waterfall IP Surveillance Enabler", Jul. 2007.

European Application # 15179410.4 Search Report dated Feb. 26, 2016.

U.S. Appl. No. 14/800,708 Office Action dated Mar. 25, 2016.

* cited by examiner

SECURE REMOTE DESKTOP

FIELD OF THE INVENTION

The present invention relates generally to digital communications and control, and particularly to systems and methods for secure communications.

BACKGROUND

In a computer network handling sensitive communications, portions of the network may be connected by one-way links. The term "one-way link" is used in the context of the present patent application and in the claims to refer to a communication link that is physically configured to carry signals in one direction and to be incapable of carrying signals in the opposite direction. Such a link, for example, may comprise a cable, such as an electrical or fiberoptic cable, with a transmitter but no receiver at one end, and a receiver but no transmitter at the other. One-way links may be implemented, for example, using Waterfall® systems, which are manufactured by Waterfall Security Solutions, Ltd. (Rosh HaAyin, Israel). When a transmitting computer is connected by a Waterfall system (or other one-way link) to a receiving computer, the receiving computer can receive data from the transmitting computer but has no physical means of sending any return communications to the transmitting computer.

One-way links may be used to prevent data either from entering or leaving a protected facility. For example, confidential data that must not be accessed from external sites may be stored on a computer that is configured to receive data over a one-way link and has no physical outgoing link over which data might be transmitted to an external site. On the other hand, in some applications, the operator of the protected facility may be prepared to allow data to exit the facility freely via a one-way link, while preventing communications from entering the facility in order to thwart hackers and cyber-terrorists.

In this latter category, for example, U.S. Pat. No. 7,649,452, whose disclosure is incorporated herein by reference, describes protection of control networks using a one-way link. As described in this patent, a method for monitoring a process includes receiving a signal from a sensor that is indicative of a physical attribute associated with the process and transmitting data indicative of the received signal over a one-way link. The transmitted data received from the one way link are used in monitoring the process. The method is described in the patent particularly in the context of Supervisory Control And Data Acquisition (SCADA) systems. A SCADA system receives monitoring data from the monitored facility via a one-way link. The SCADA system is unable to transmit any sort of data back to the monitored facility (although a separate, open-loop connection may be provided for this purpose), and therefore cannot be used as the base for an attack on the facility.

To facilitate remote monitoring of industrial networks, Waterfall Security Solutions offers a product known as Remote Screen View (RSV), which uses an internal, hardware-based, unidirectional fiberoptic link to replicate, in real-time, servers and workstations screens located in industrial networks to corporate or external networks. This product is said to provide secure, unidirectional screen replication from industrial networks to corporate networks. Due to the design of the hardware itself, data flow from the corporate network towards the industrial network is physically impossible.

In practice, there is sometimes a need to transmit information or commands from an external network back into a monitored facility that is protected by use of an outgoing one-way link. A solution to this need is proposed, for example, in U.S. Patent Application Publication 2014/0068712, whose disclosure is incorporated herein by reference. This publication describes communication apparatus that includes a one-way, hardware-actuated data relay, which includes a first hardware interface configured to receive a command from a communications network and a second hardware interface configured to convey the received command to a protected destination when the relay is actuated. A decoder includes a third hardware interface configured to receive a digital signature for the command from the communications network and hardware decoding logic coupled to verify the digital signature and to actuate the relay upon verifying the digital signature, whereby the command is conveyed via the second hardware interface to the protected destination.

U.S. Patent Application Publication 2010/0278339, whose disclosure is incorporated herein by reference, describes apparatus in which an encryption processor is coupled between an input transducer, such as a keyboard, microphone, touch screen or imaging device, and a computer. The encryption processor receives and encrypts input data signals from the input transducer, so that the data input from the input transducer to the computer is already encrypted. Typically, the computer is able to access the input transducer only via the encryption processor, so that an unauthorized party cannot gain access to the clear signals that are produced by the input transducer itself. The computer may then transmit and/or store the input data from the input transducer in encrypted form, without ever having to decrypt the data.

SUMMARY

Embodiments of the present invention that are described hereinbelow provide apparatus and methods for secure communication with a protected installation.

There is therefore provided, in accordance with an embodiment of the present invention, a method for communication, which includes receiving in a secure installation via a network from a remote user terminal an input including a stream of symbols that has been encrypted using a preselected encryption key. The encrypted stream of symbols is decoded in the secure installation using a decryption key corresponding to the preselected encryption key, to produce a clear stream of symbols. Using a computer program running on a processor in the secure installation, the symbols in the clear stream are processed, and a graphical output is generated in a predefined display format in response to processing the symbols. The graphical output is outputted from the secure installation to the network in an unencrypted format for display on the remote user terminal.

In some embodiments, the method includes generating the encrypted stream at the remote user terminal by applying the preselected encryption key using an encoder in a secure input device of the remote user terminal such that the encryption key is inaccessible to a central processing unit of the terminal. The symbols in the stream may be alphanumeric characters.

Typically, outputting the graphical output includes replicating a local display of the processor in the secure installation on a remote display at the remote user terminal. Receiving the encrypted stream of symbols and generating the graphical output may provide a remote desktop functionality at the remote user terminal for controlling predefined functions of the secure installation.

In a disclosed embodiment, decoding the encrypted stream includes inputting the symbols to the secure installation via a first one-way link, and outputting the graphical output includes conveying the graphical output to the network via a second one-way link.

In one embodiment, the secure installation includes an industrial control system, and the input from the remote user terminal is configured to control an operating configuration of the industrial control system.

There is also provided, in accordance with an embodiment of the present invention, communication apparatus for deployment in a secure installation. The apparatus includes an input interface, which is configured to receive via a network from a remote user terminal outside the secure installation an input including a stream of symbols that has been encrypted using a preselected encryption key. A decoder is coupled to receive the encrypted stream of symbols from the interface and configured to decrypt the encrypted stream using a decryption key corresponding to the preselected encryption key, to produce a clear stream of symbols. A computer is configured to run a software program that causes the computer to process the symbols in the clear stream and to generate a graphical output in a predefined display format in response to processing the symbols. An output interface is configured to convey the graphical output to the network in an unencrypted format for display on the remote user terminal.

There is additionally provided, in accordance with an embodiment of the present invention, a method for communication, which includes receiving in a secure installation via a network from a remote user terminal an input including a stream of symbols that has been encrypted using a preselected encryption key. The encrypted stream of symbols is decrypted in the secure installation using a decryption key corresponding to the preselected encryption key, to produce a clear stream of symbols. Using a computer program running on a processor in the secure installation, the symbols in the clear stream are processed, and a graphical output is generated in a predefined display format in response to processing the symbols. The graphical output is outputted from the secure installation to the network for display on the remote user terminal.

In one embodiment, outputting the graphical output includes encrypting the graphical output, and transmitting only the encrypted graphical output to the network. Typically, the graphical output is received and decrypted at the remote user terminal so as to replicate a local display of the processor in the secure installation on a remote display at the remote user terminal and to provide a remote desktop functionality at the remote user terminal for controlling predefined functions of the secure installation.

There is further provided, in accordance with an embodiment of the present invention, communication apparatus for deployment in a secure installation. The apparatus includes an input interface, which is configured to receive via a network from a remote user terminal outside the secure installation an input including a stream of symbols that has been encrypted using a preselected encryption key. A decoder is coupled to receive the encrypted stream of symbols from the interface and configured to decrypt the encrypted stream using a decryption key corresponding to the preselected encryption key, to produce a clear stream of symbols. A computer is configured to run a software program that causes the computer to process the symbols in the clear stream and to generate a graphical output in a predefined display format in response to processing the symbols. An output interface is configured to convey the graphical output to the network for display on the remote user terminal.

The present invention will be more fully understood from the following detailed description of the embodiments thereof, taken together with the drawings in which:

DETAILED DESCRIPTION OF EMBODIMENTS

Figure 1:
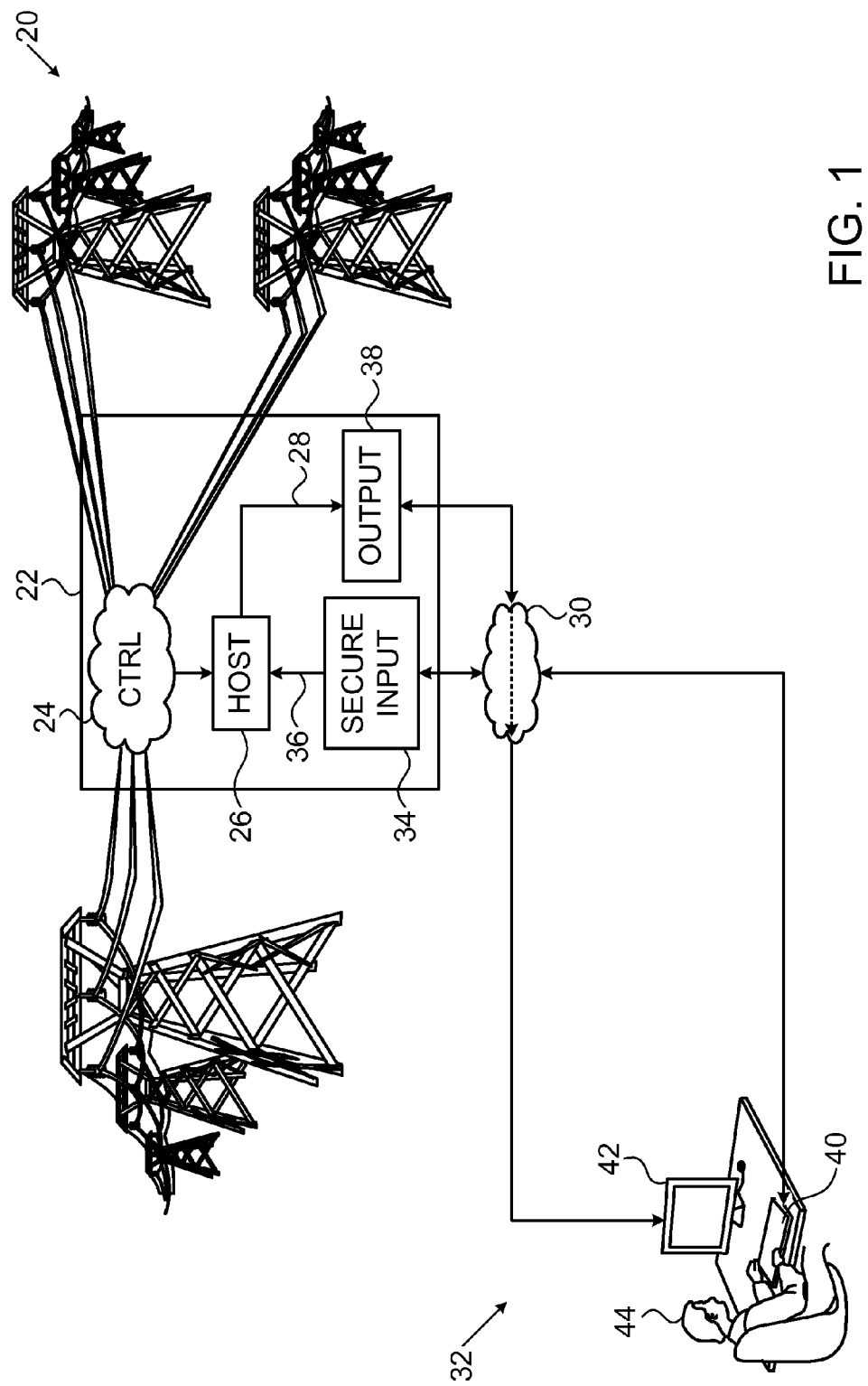
FIG. 1 is a block diagram that schematically illustrates a system for secure monitoring and control, in accordance with an embodiment of the present invention.

Remote desktop functionality is available on a wide range of different types of computers and operating systems. Remote desktop software, running on a host computer and a remote client computer that are connected by a network (such as the Internet), allows the user of the client computer to operate the host computer by remote control. Specifically, the software enables the client computer to display a copy of the host computer screen (the "desktop") and to transmit user inputs, such as keystrokes and mouse actions, from the client to the host computer. Remote desktop software is particularly useful in system administration and maintenance functions, as it allows qualified personnel to service computers in remote locations without actually traveling to the locations.

At the same time, remote desktop operation creates a severe security risk for the host computer, since it surrenders the host computer to the control of a remote operator while giving the operator immediate feedback as to the effect of inputs transmitted to the host computer. Although certain security measures are commonly incorporated in remote desktop software packages that are known in the art, such as password protection, these measures are not generally considered sufficient to allow remote desktop functionality to be used on host computers in secure installations, such as in the type of closed facility that is described in the above-mentioned U.S. Pat. No. 7,649,452. In some such installations, a certain degree of network-based remote control may be possible using a limited command set, as described, for example, in the above-mentioned U.S. Patent Application Publication 2014/0068712. More complex administrative and maintenance operations, however, can be carried out only on site.

To reduce the need for this sort of site visit by technical personnel (and on the other hand, to reduce the use of insufficient security measures as a default), embodiments of the present invention that are described herein provide methods and apparatus that enable remote desktop functionality in a secure installation while maintaining a high level of security against unauthorized access. These embodiments use hardware components to separate the input from a remote user terminal to the secure installation from the graphical display output that is provided by the installation and thus avoid creating a closed communication loop that could be exploited by a malicious party.

In the disclosed embodiments, the input to the secure installation comprises a stream of symbols that has been encrypted by the remote user terminal using a preselected encryption key. A decoder in the secure installation converts the encrypted input back into a clear stream of symbols, using a corresponding decryption key. Thus, the remote desktop functionality of the secure installation can be accessed only by a client device that is in possession of the proper encryption key. For enhanced security, the encrypted symbol stream may be generated using a hardware-based encoder in a secure input device of the remote user terminal. The encryption key is held securely in the input device and is inaccessible to the central processing unit (CPU) of the terminal (if the terminal has a CPU) and other non-secure components of the terminal, and possibly inaccessible to the operator of the terminal, as well.

After decoding in the secure installation, a computer program running on a host processor in the secure installation processes the symbols in the clear stream. The program generates a graphical output in a predefined display format in response to processing the symbols and conveys the graphical output from the secure installation to the network in an unencrypted format. The remote user terminal receives and displays this graphical output, and thus allows the user of the terminal to observe the effect of the (encrypted) input that the remote terminal has transmitted to the secure installation. The graphical output may simply replicate a local display of the processor in the secure installation, and may be viewed on any remote display.

Thus, the user of the remote user terminal enjoys the benefit of remote desktop functionality without creating a closed communication loop and without actually running any remote client software on the terminal, which might otherwise enable an attacker to gain access to this functionality. Rather, the user inputs are securely encrypted, typically by a dedicated device independent of user terminal software, while the graphical output from the secure installation may be received and displayed on the terminal screen, typically without any further processing. Alternatively, for additional data security, the graphical output from the secure installation may be encrypted, in which case the user terminal is equipped with a suitable secure decoder in order to decrypt and display the output.

Depending on application requirements and security constraints, the symbols transmitted by the user terminal may be limited to alphanumeric characters, or they may additionally include symbols of other types, such as symbols representing mouse actions or other data inputs. Similarly, the decoder and processor in the secure installation may be configured (in hardware and/or software) to allow the remote user to control only certain predefined functions of the secure installation, or they may allow full user access to all available functionality.

FIG. 1 is a block diagram that schematically illustrates a system 20 for secure monitoring and control, in accordance with an embodiment of the present invention. In this example, system 20 is used to monitor and control an industrial control system in a utility control station 22, such as a transmission and switching station of an electric power utility. Although for the sake of simplicity, only a single station 22 is shown in FIG. 1, in practice utilities generally operate many such stations. Station 22 typically comprises an internal control network 24, which includes operational elements, such as switches, which make, break and adjust power connections, as well as monitoring components, such as sensors. In many actual systems, stations 22 are unmanned, and are monitored and controlled remotely. In the present embodiment, station 22 is controlled by a remote user terminal 32 using remote desktop functionality, as described herein.

Although the pictured example relates, by way of illustration, to an electric power utility, the principles of the present invention are not limited to this particular operating context. Rather, the apparatus and methods that are described below may be applied to utilities of other types (such as gas or water utilities, for instance), as well as in industrial environments and substantially any other application in which tight control is to be exercised over commands that may be input to a protected installation. Station 22 is just one example of such an installation. Certain embodiments of the present invention are described hereinbelow, for the sake of clarity and without limitation, with respect to the elements of system 20, but the principles of these embodiments and the techniques that they incorporate may similarly be applied in other operating environments in which an installation is to be protected from undesired data input and unauthorized access.

Station 22 is typically designed as a closed, secure facility, protected physically against unauthorized entry. A host computer 26 in station 22 inputs commands to the switches on network 24 and monitors the operation of the switches and other components of the station. Typically, network 24 comprises multiple sensors and actuators, which are distributed throughout station 22 and report via a secure internal network to host computer 26, as described, for example, in the above-mentioned U.S. Pat. No. 7,649,452. Computer 26 outputs information, including a graphical display output, via a one-way link 28 to an output interface 38. Output interface 38 is connected to a network 30, which conveys the output information to terminal 32. Network 30 may comprise any suitable wired or wireless network, or a combination of such networks, including public networks, such as the Internet.

One-way link 28 conveys output information from station 22 to network 30 but is physically incapable of conveying input data from the network to the station. For this latter purpose, station 22 comprises a secure input 34, which typically has an input interface coupled to network 30 and another interface to the protected elements of the station. In this example, secure input 34 receives and decodes a stream of encrypted symbols transmitted by terminal 32 over network 30, and decodes and conveys the symbols over a one-way link 36 to host computer 26. Details of the structure and operation of secure input 34 are described further hereinbelow with reference to FIG. 2. Host computer 26 receives no inputs from network 30 other than via input 34, which is typically contained in station 22 and is thus itself protected from physical and electrical tampering.

Figure 3:
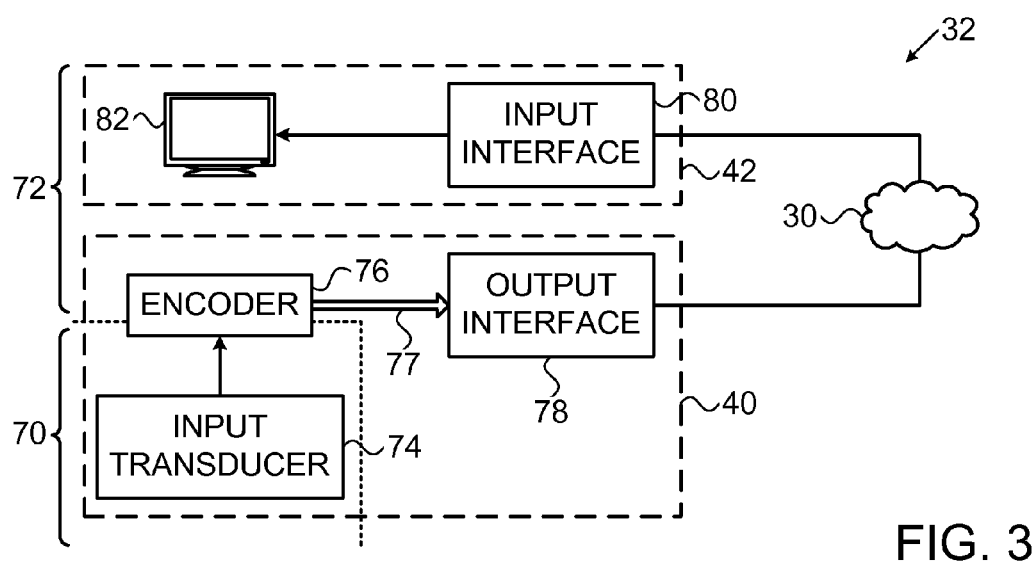
FIG. 3 is a block diagram that schematically shows functional elements of a user terminal for secure communication with a protected installation, in accordance with an embodiment of the present invention.

An operator 44 of terminal 32 interacts with host computer 26 using a remote desktop paradigm, as though the operator was entering input directly to the computer and viewing the effect of this input on the computer display screen. A secure input device 40 in terminal 32 receives inputs from operator 44 and encodes these inputs as an encrypted symbol stream using a preselected encryption key. Input device 40 comprises a one-way link (as shown in FIG. 3) between the encryption circuit and the output from the device so that the user input cannot be manipulated remotely and cannot be altered on the way to station 22. Terminal 32 transmits the encrypted symbol stream over network 30 to secure input 34, which decodes the symbols and thus provides a corresponding clear symbol stream to host computer 26. At the same time, a display 42 (which is not connected to the user input side of input device 40 and thus cannot close the communication loop) presents to operator 44 the graphical display output generated by host computer 26 and transmitted over network 30 via output interface 38. As illustrated in FIG. 1, the input path from input device 40 of terminal 32 to computer 26 and the output path from the computer to display 42 are separate and independent, without any electronic interaction between these paths within terminal 32. The only actual connection between the input and output paths is the cognitive connection made by operator 44.

The operator inputs accepted by input device 40 typically comprise alphanumeric characters (and may consist exclusively of alphanumeric characters in order to reduce the risk of a cyber-attack on station using non-standard characters). Alternatively or additionally, the symbol stream generated and transmitted by input device 40 may encode other operator inputs, such as mouse actions, or equivalently, user interactions with a joystick, touchscreen or other tactile input transducer, as well as audio and/or video input.

Typically (although not necessarily), as illustrated in FIG. 3, input device 40 comprises hardware logic for encrypting the symbol stream that is to be transmitted over network 30, and may not include any software-driven components, such as a central processing unit (CPU). The input device may encode the symbol stream using strong encryption and cryptographic authentication techniques that are known in the art, such as RSA public-key cryptography, so that secure input 34 can distinguish input sent by an authentic source from other inputs and attacks. These features are useful in preventing an attacker from mimicking or gaining control externally over the encoding functions of input device 40. Additionally or alternatively, the input device may include a timestamp and/or sequence number in the symbol stream that it generates in order to foil replay attacks.

Input device 40 may additionally be protected by electronic and other means against an attacker who succeeds in gaining physical control over the device, but these means are beyond the scope of the present disclosure. For example, input device 40 may require the user to enter a password and/or comprise a biometric identification module, such as a fingerprint reader.

Figure 2:
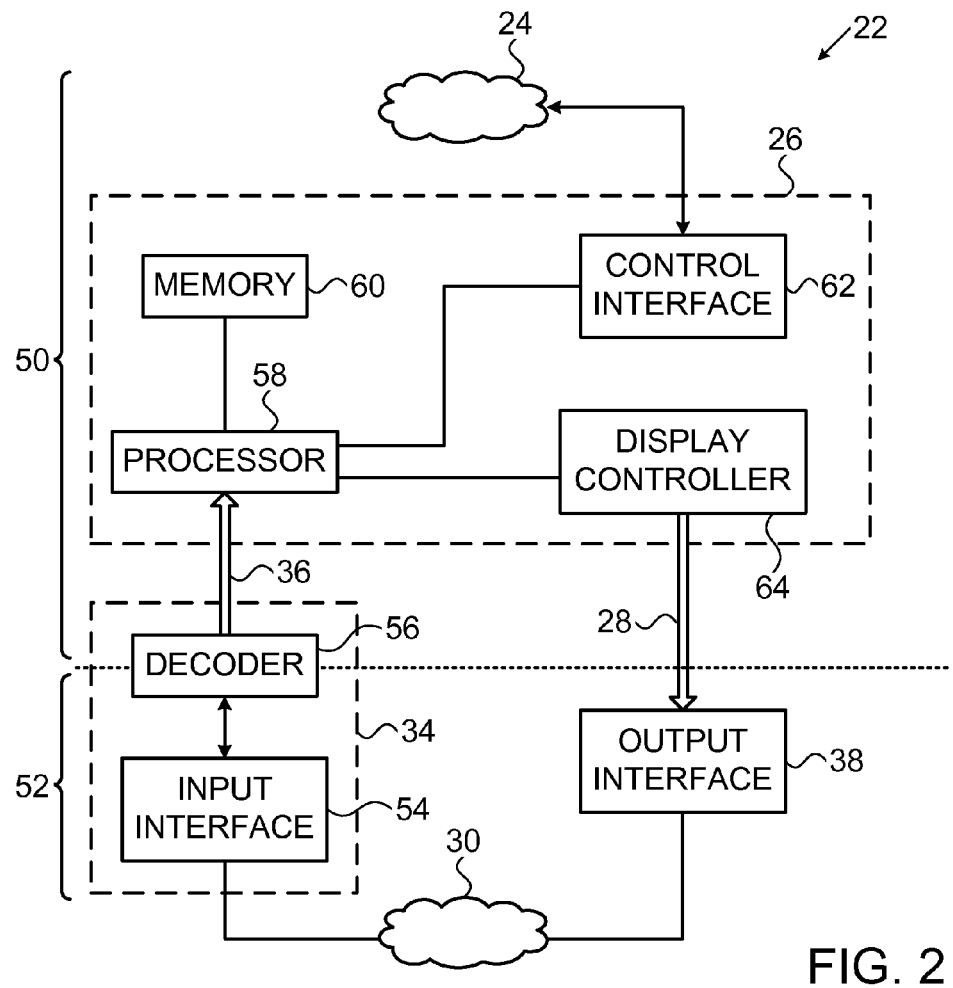
FIG. 2 is a block diagram that schematically shows functional elements of a protected installation in a system for secure monitoring and control, in accordance with an embodiment of the present invention.

FIG. 2 is a block diagram that schematically shows functional elements of station 22, and particularly of secure input 34 and host computer 26, in accordance with an embodiment of the present invention. Station 22 comprises a secure zone 50, including host computer 26 and network 24, which is accessible to external communications to and from network 30 only through a buffer zone 52. One-way links 36 and 28 enforce the input and output traffic directions against unauthorized access.

Secure input 34 comprises an input interface 54, such as a network interface controller, which receives packets from network 30 and passes the packet payloads to a decoder 56. The decoder typically comprises suitable hardware logic, which applies a decryption key corresponding to the encryption key used by input device 40 in order to convert the encrypted input into a clear stream of symbols. (For example, the decryption key may be the public key corresponding to the private key used by the input device; or if a symmetric encryption method is used, the decryption key may be identical to the encryption key.) Optionally, decoder 56 may apply additional means, such as verification of a digital signature, sequence number and/or timestamp applied by input device 40, as well as payload structure filtering, to authenticate the received symbol stream. Only when the decoder has successfully decoded and verified the input symbols does it pass the corresponding clear stream of symbols over one-way link 36 to host computer 26.

Host computer 26 may comprise a standard server, which in the embodiment of FIG. 1 is typically adapted for industrial control applications. The host computer comprises a processor 58, such as a general-purpose software-controlled central processing unit (CPU), with a suitable memory 60 and a control interface 62 to control network 24. The input symbol stream conveyed by decoder 56 to processor 58 over one-way link 36 may represent, for example, a stream of characters and/or mouse actions, as explained above. A suitable software driver running on processor 58 causes the processor to accept and respond to these characters and/or mouse actions as though they were generated by local user interface devices connected physically to computer 26. This driver functionality is similar in operation to the input portion of remote desktop host software.

Software running on processor 58 processes these remote keyboard and/or mouse inputs, as well as information from memory 60 and control interface 62, and causes the processor to generate and update display commands to a display controller 64. The display controller generates a graphical output suitable for driving a display screen, typically in a standard display format. Instead of (or in addition to) driving a local screen connected physically to computer 26, however, display controller 64 generates a stream of graphical data, which it conveys via one-way link 28 to output interface 38. For example, the graphical data may comprise a sequence of JPEG- or MPEG-encoded screen shots, which are encapsulated by output interface 38 in data packets for transmission over network 30. Alternatively, the display controller and output interface may output screen data in any other suitable video or graphical format that is known in the art. The video stream can be output over one-way link 28 in clear text, or encrypted.

FIG. 3 is a block diagram that schematically shows details of remote user terminal 32, in accordance with an embodiment of the present invention. As explained above, terminal 32 comprises secure input device 40 and display 42, which are physically and functionally separate elements. In this embodiment, terminal 32 comprises no CPU, and there is no need for such a CPU in implementing the remote desktop functionality that is described herein. In other embodiments, however (not shown in the figures), terminal 32 may comprise a CPU and other components to support other computing and communication functions.

Like station 22, terminal 32 comprises a secure zone 70, which is protected from unauthorized access, and a buffer zone 72, which communicates with network 30. Within secure zone 70, a user input transducer 74, such as a keyboard, mouse, or other user-operated element, is operated by an authorized user to generate an input stream to an encoder 76. If the input stream is not already formatted as a sequence of symbols (such as characters from a keyboard), encoder 76 converts the stream to symbols. The encoder then encrypts the stream using an appropriate encryption key, while optionally applying other security measures, such as digital signatures, sequence numbers and/or timestamps, as described above. Typically, although not necessarily, encoder 76 performs the encryption using hardware logic and holds the encryption key in memory (not shown) that is inaccessible to user 44 of terminal 32, as well as to any CPU that may be used in running software-based functions of the terminal.

Thus, the only data that exits secure zone 70 is the encrypted symbol stream that is output by encoder 76 via a one-way link 77 to an output interface 78 of terminal 32, while the clear input from transducer 74 and the encryption key used by the encoder are inaccessible from buffer zone 72. Output interface 78 generates a communication stream containing the encoded symbols for transmission over network 30 to secure input 34 of station 22. Output interface 78 may, for example, establish a secure connection (such as a Transport Layer Security [TLS] encrypted connection, as is known in the art) with secure input 34 over network 30. This sort of conventional data security measure adds a further layer of protection to the operation of the dedicated hardware logic.

Display 42 comprises an input interface 80, which receives packets of graphical data from output interface 38 of station via network 30. Input interface 80 extracts the graphical data from the packets and applies the data to drive a display screen 82. Operator 44 is thus able to observe, in real time, the response of computer 26 to the inputs provided via input device 40 and to interact with computer 26 in accordance with a remote desktop paradigm. Any other user may similarly observe the remote display, which need not be protected by security measures. Only an authorized operator in possession and control of secure input device 40, however, can actually access the remote desktop functionality that is provided by station 22.

The elements of station 22 and terminal 32 are shown in the figures and described above in terms of separate functional blocks solely for the sake of convenience and conceptual clarity. In practical implementations, two or more of these blocks may be combined in a single circuit element or, additionally or alternatively, certain blocks may be broken down into separate sub-blocks and circuits. All such embodiments are considered to be within the scope of the present invention.

Figure 4A:
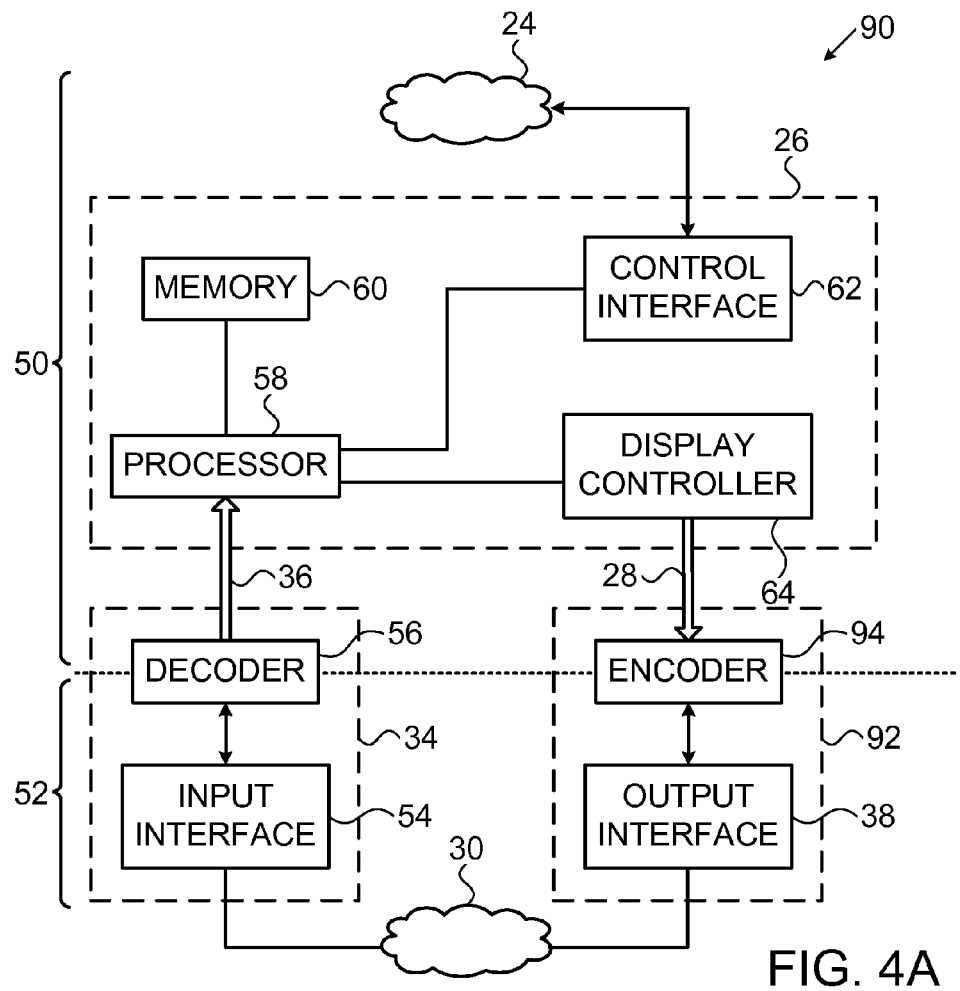
FIGS. 4A and 4B are block diagrams that schematically show, respectively, functional elements of a protected installation and of a user terminal for secure communication with the protected installation, in accordance with an alternative embodiment of the present invention.
Figure 4B:
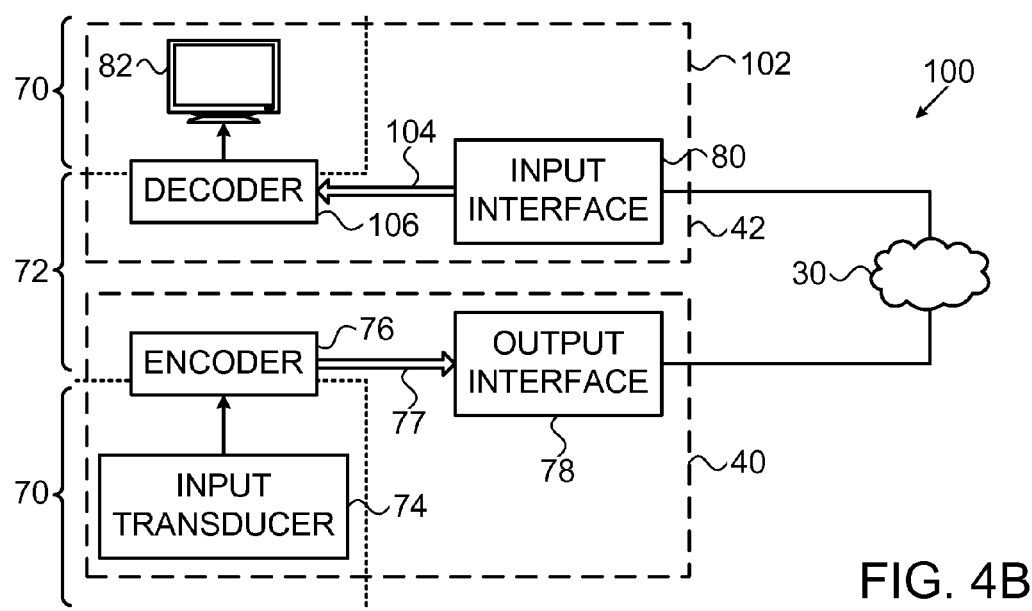

FIGS. 4A and 4B are block diagrams that schematically show, respectively, functional elements of a protected installation 90 and of a user terminal 100 for secure communication with the protected installation, in accordance with an alternative embodiment of the present invention. In terms of general functionality, installation 90 and user terminal 100 operate in a similar fashion to installation 22 and user terminal 32 in system 20, as described above. Therefore, like elements of installation 90 and user terminal 100 are labeled with the same numbers as the corresponding elements in system 20, and the description that follows will focus mainly on the elements of the present embodiment that differ from the preceding embodiments.

Whereas installation 22 transmits its graphical output to network 30 in an unencrypted format, installation 90 provides an added layer of security by encrypting the graphical output. For this purpose, installation 90 comprises a secure output 92, in which an encoder 94 encrypts the graphical output generated by display controller 64 using a preselected encryption key, applying any suitable encryption technique. One-way link 28 conveys he graphical output from display controller 64 to encoder 94. Output interface 38 then transmits the encrypted graphical output from encoder 94 to network 30. Optionally, the operator of installation 90 may switch the encryption function of encoder 94 on or off depending on the desired security configuration.

User terminal 100 comprises a secure display 102, comprising a decoder 106 that is programmed to decrypt the encrypted graphical output transmitted from secure installation 90. Input interface 80 in secure display 102 passes the encrypted graphical data to decoder 106 via a one-way link to prevent tampering and data access by unauthorized parties. Decoder 106 feeds the decrypted graphical output to display screen 82 in secure zone 70 of user terminal 100. As in the preceding embodiments, display 102 is not connected to the user input side of input device 40 in terminal 100 and thus cannot in itself close the communication loop.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
receiving in a secure installation via a network from a remote user terminal an input comprising a stream of symbols that has been encrypted using a preselected encryption key;
decoding the encrypted stream of symbols in the secure installation using a decryption key corresponding to the preselected encryption key, to produce a clear stream of symbols;
inputting the clear stream of symbols via a first one-way link to a processor in the secure installation;
using a computer program running on the processor in the secure installation, processing the symbols in the clear stream and generating a graphical output in a predefined display format in response to processing the symbols; and
outputting the graphical output from the secure installation via a second one-way link to the network in an unencrypted format for display on the remote user terminal,
wherein an input path for conveying the stream of symbols from the remote user terminal to the processor and an output path for conveying the graphical output from the processor to a display on the remote user terminal are separate and independent paths, without any electronic interaction between the input and output paths within the remote user terminal.

2. The method according to claim 1, and comprising generating the encrypted stream at the remote user terminal by applying the preselected encryption key using an encoder in a secure input device of the remote user terminal such that the encryption key is inaccessible to a central processing unit of the terminal.

3. The method according to claim 1, wherein outputting the graphical output comprises replicating a local display of the processor in the secure installation on the display at the remote user terminal.

4. The method according to claim 3, wherein receiving the encrypted stream of symbols and generating the graphical output provide a remote desktop functionality at the remote user terminal for controlling predefined functions of the secure installation.

5. The method according to claim 1, wherein the symbols in the stream are alphanumeric characters.

6. The method according to claim 1, wherein the secure installation comprises an industrial control system, and wherein the input from the remote user terminal is configured to control an operating configuration of the industrial control system.

7. The method according to claim 4, wherein replicating the local display comprises encapsulating and transmitting a sequence of screen shots of the local display.

8. The method according to claim 1, wherein the processor is accessible to communications to and from the network only through the first and second one-way links.

9. Communication apparatus for deployment in a secure installation, the apparatus comprising:
an input interface, which is configured to receive via a network from a remote user terminal outside the secure installation an input comprising a stream of symbols that has been encrypted using a preselected encryption key;
a decoder, which is coupled to receive the encrypted stream of symbols from the interface and configured to decrypt the encrypted stream using a decryption key corresponding to the preselected encryption key, to produce a clear stream of symbols;

a computer, which is configured to run a software program that causes the computer to process the symbols in the clear stream and to generate a graphical output in a predefined display format in response to processing the symbols;

a first one-way link, coupled to convey the clear stream of symbols from the decoder to the computer;

an output interface, which is configured to convey the graphical output to the network in an unencrypted format for display on the remote user terminal; and a second one-way link, coupled to convey the graphical output from the computer to the output interface, wherein an input path for conveying the stream of symbols from the remote user terminal to the processor and an output path for conveying the graphical output from the processor to a display on the remote user terminal are separate and independent paths, without any electronic interaction between the input and output paths within the remote user terminal.

10. The apparatus according to claim 9, wherein the graphical output is configured to replicate a local display of the computer in the secure installation on the display at the remote user terminal.

11. The apparatus according to claim 10, wherein the software program running on the computer provides a remote desktop functionality at the remote user terminal for controlling predefined functions of the secure installation.

12. The apparatus according to claim 9, wherein the symbols in the stream are alphanumeric characters.

13. The apparatus according to claim 9, wherein the secure installation comprises an industrial control system, and wherein the input from the remote user terminal is configured to control an operating configuration of the industrial control system.

14. The apparatus according to claim 9, and comprising the remote user terminal, wherein the terminal comprises a secure input device that encrypts the stream of symbols using an encryption key that is inaccessible to a central processing unit of the terminal.

15. A method for communication, comprising:

receiving in a secure installation via a network from a remote user terminal an input comprising a stream of symbols that has been encrypted using a preselected encryption key;

decoding the encrypted stream of symbols in the secure installation using a decryption key corresponding to the preselected encryption key, to produce a clear stream of symbols;

inputting the clear stream of symbols via a first one-way link to a processor in the secure installation;

using a computer program running on the processor in the secure installation, processing the symbols in the clear stream and generating a graphical output in a predefined display format in response to processing the symbols; and outputting the graphical output from the secure installation via a second one-way link to the network for display on the remote user terminal, wherein an input path for conveying the stream of symbols from the remote user terminal to the processor and an output path for conveying the graphical output from the processor to a display on the remote user terminal are separate and independent paths, without any electronic interaction between the input and output paths within the remote user terminal.

16. The method according to claim 15, wherein outputting the graphical output comprises receiving the graphical output in an encoder from the processor via the second one-way link, encrypting the graphical output in the encoder, and transmitting only the encrypted graphical output to the network.

17. The method according to claim 16, wherein the graphical output is received and decrypted at the remote user terminal so as to replicate a local display of the processor in the secure installation on the display at the remote user terminal and to provide a remote desktop functionality at the remote user terminal for controlling predefined functions of the secure installation.

18. Communication apparatus for deployment in a secure installation, the apparatus comprising:

an input interface, which is configured to receive via a network from a remote user terminal outside the secure installation an input comprising a stream of symbols that has been encrypted using a preselected encryption key;

a decoder, which is coupled to receive the encrypted stream of symbols from the interface and configured to decrypt the encrypted stream using a decryption key corresponding to the preselected encryption key, to produce a clear stream of symbols;

a computer, which is configured to run a software program that causes the computer to process the symbols in the clear stream and to generate a graphical output in a predefined display format in response to processing the symbols;

a first one-way link, coupled to convey the clear stream of symbols from the decoder to the computer;

an output interface, which is configured to convey the graphical output to the network for display on the remote user terminal; and a second one-way link, coupled to convey the graphical output from the computer to the output interface, wherein an input path for conveying the stream of symbols from the remote user terminal to the processor and an output path for conveying the graphical output from the processor to a display on the remote user terminal are separate and independent paths, without any electronic interaction between the input and output paths within the remote user terminal.

19. The apparatus according to claim 18, and comprising an encoder, which is coupled to receive the graphical output from the computer via the second one-way link and is configured to encrypt the graphical output from the computer and convey the encrypted graphical output to the output interface for transmission over the network.

20. The apparatus according to claim 19, wherein the graphical output is received and decrypted at the remote user terminal so as to replicate a local display of the processor in the secure installation on the display at the remote user terminal and to provide a remote desktop functionality at the remote user terminal for controlling predefined functions of the secure installation.

* * * * *